US012683144B2

(12) United States Patent
Kim et al.

(10) Patent No.: US 12,683,144 B2
(45) Date of Patent: Jul. 14, 2026

(54) ELECTRODE FOR SECONDARY BATTERY AND MANUFACTURING METHOD THEREOF

(71) Applicant: Samsung SDI Co., Ltd., Yongin-si (KR)

(72) Inventors: Geonsoo Kim, Yongin-si (KR); Sanghyun Yoo, Yongin-si (KR); Junsub Lee, Yongin-si (KR); Pilgoo Jun, Yongin-si (KR); Gee Eun Lim, Yongin-si (KR); Woonseok Chang, Yongin-si (KR); Kyuyoung Park, Yongin-si (KR); Taejin Yoon, Yongin-si (KR); Seonjin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 19/007,865

(22) Filed: Jan. 2, 2025

(65) Prior Publication Data

US 2025/0309237 A1 Oct. 2, 2025

(30) Foreign Application Priority Data

Mar. 28, 2024 (KR) ........................ 10-2024-0042811

(51) Int. Cl.
H01M 4/139 (2010.01)
B23K 26/362 (2014.01)
(Continued)

(52) U.S. Cl.
CPC ........... H01M 4/139 (2013.01); B23K 26/362 (2013.01); H01M 4/0404 (2013.01); H01M 10/0587 (2013.01)

(58) Field of Classification Search
None
See application file for complete search history.

(56) References Cited

U.S. PATENT DOCUMENTS

2015/0017523 A1* 1/2015 Hirai ................... H01M 50/533
427/126.3
2015/0380716 A1* 12/2015 Zama .................. H01M 50/536
429/211
(Continued)

FOREIGN PATENT DOCUMENTS

CN 104303344 A 1/2015
CN 107170950 A 9/2017
(Continued)

OTHER PUBLICATIONS

Machine translation of KR100646550 B1, published on Nov. 14, 2006 (Year: 2006).*

(Continued)

*Primary Examiner* — Anca Eoff
(74) *Attorney, Agent, or Firm* — Wolf, Greenfield & Sacks, P.C.

(57) ABSTRACT

Provided is an electrode for secondary battery. The electrode may include a substrate, a first coated portion disposed on a first surface of the substrate, the first coated portion comprising an active material; and a first uncoated portion disposed on the first surface of the substrate, the first uncoated portion being in contact with the first coated portion and exposing the substrate, wherein a first side portion of the first coated portion in contact with the first uncoated portion has a stepped surface.

7 Claims, 13 Drawing Sheets

(51) Int. Cl.
  *H01M 4/04* (2006.01)
  *H01M 10/0587* (2010.01)

(56) References Cited

U.S. PATENT DOCUMENTS

| | | | |
|---|---|---|---|
| 2016/0190539 A1 | 6/2016 | Sakaguchi et al. | |
| 2017/0309887 A1 | 10/2017 | Hirai et al. | |
| 2018/0358645 A1 | 12/2018 | Hasegawa | |
| 2019/0198853 A1 | 6/2019 | Nishio et al. | |
| 2020/0058962 A1* | 2/2020 | Kim .................... | H01M 50/538 |
| 2020/0112064 A1 | 4/2020 | Matsui et al. | |
| 2020/0243895 A1* | 7/2020 | Zama ................ | H01M 10/0413 |
| 2022/0158152 A1 | 5/2022 | Lee et al. | |
| 2023/0378425 A1 | 11/2023 | Lee et al. | |

FOREIGN PATENT DOCUMENTS

| | | | |
|---|---|---|---|
| CN | 113078284 A | 7/2021 | |
| CN | 216145643 U | 3/2022 | |
| EP | 2860798 A1 | 4/2015 | |
| EP | 2 966 721 A1 | 1/2016 | |
| EP | 3 637 506 B1 | 2/2022 | |
| EP | 4 365 973 A1 | 8/2024 | |
| EP | 4 485 555 A1 | 1/2025 | |
| EP | 4523836 A1 | 3/2025 | |
| JP | 2011-138729 A | 7/2011 | |
| JP | 2017-010644 A | 1/2017 | |
| KR | 100646550 B1 * | 11/2006 | .......... B05C 5/0254 |
| KR | 10-2015-0122940 A | 11/2015 | |
| KR | 10-2016-0111709 A | 9/2016 | |
| KR | 10-2020-0130563 A | 11/2020 | |
| KR | 10-2023-0014436 A | 1/2023 | |
| KR | 10-2023-0031166 A | 3/2023 | |
| KR | 10-2023-0171861 A | 12/2023 | |
| WO | WO 2013/137385 A1 | 9/2013 | |
| WO | WO 2013/187172 A1 | 12/2013 | |
| WO | WO 2016/063612 A1 | 4/2016 | |
| WO | WO 2017/110684 A1 | 6/2017 | |
| WO | WO 2018/155210 A1 | 8/2018 | |

OTHER PUBLICATIONS

Korean Office Action dated May 20, 2024, in connection with Korean Application No. KR 10-2024-0042811.

Extended European Search Report dated Aug. 6, 2025, in European Application No. 25166674.9.

Japanese Office Action issued on Jul. 1, 2025, in connection with Japanese Application No. 2025-002155.

Chinese Office Action dated Dec. 17, 2025, in connection with Chinese Application No. 202510332819.6.

* cited by examiner

800

ELECTRODE FOR SECONDARY BATTERY AND MANUFACTURING METHOD THEREOF

CROSS-REFERENCE TO RELATED APPLICATIONS

This present application claims priority to and the benefit under 35 U.S.C. § 119 (a)-(d) of Korean Application No. 10-2024-0042811, filed on Mar. 28, 2024, in the Korean Intellectual Property Office, the entire disclosure of which is incorporated herein by reference.

FIELD

Aspects of embodiments of the present disclosure relate to an electrode for a secondary battery and a manufacturing method thereof.

BACKGROUND

Unlike primary batteries that are not designed to be (re) charged, secondary (or rechargeable) batteries are batteries that are designed to be discharged and recharged. Low-capacity secondary batteries are used in portable, small electronic devices, such as smart phones, feature phones, notebook computers, digital cameras, and camcorders, while large-capacity secondary batteries are widely used as power sources for driving motors in hybrid vehicles and electric vehicles and for storing power (e.g., home and/or utility scale power storage). A secondary battery generally includes an electrode assembly composed of a positive electrode and a negative electrode, a case accommodating the same, and electrode terminals connected to the electrode assembly.

Electrodes used in secondary batteries are manufactured by applying an active material onto an electrode substrate, which is a metal thin film made up of materials such as lithium, aluminum, nickel, copper, and the like, followed by drying and rolling processes. On the electrode substrate, there are a coated region where the active material is applied and an uncoated region where no active material is applied and the substrate is exposed. Meanwhile, during the drying process of the active material, as both the active material and the substrate shrink, wrinkles can form in the uncoated region, which leads to a decrease in the quality of the battery.

The above information disclosed in this Background section is for enhancement of understanding of the background of the present disclosure, and therefore, it may contain information that does not constitute related (or prior) art.

SUMMARY

The problem addressed by the present disclosure is to provide an electrode for a secondary battery and a manufacturing method thereof to address the above problems.

These and other aspects and features of the present disclosure will be described in or will be apparent from the following description of embodiments of the present disclosure.

To realize at least one of the above objectives, an electrode according to one or more embodiments of the present disclosure may include a substrate, a first coated portion disposed on a first surface of the substrate, the first coated portion comprising an active material; and a first uncoated portion disposed on the first surface of the substrate, the first uncoated portion being in contact with the first coated portion and exposing the substrate, wherein a first side portion of the first coated portion in contact with the first uncoated portion has a stepped surface.

According to one or more embodiments of the present disclosure, the first side portion may include a first sidewall formed at a first angle with respect to the first surface of the substrate, and a second sidewall formed at a second angle with respect to the first surface of the substrate, the stepped surface may connect the first sidewall and the second sidewall, and the first sidewall may be in contact with the first uncoated portion.

According to one or more embodiments of the present disclosure, each of the first angle and the second angle may be in a range from 80 degrees to 90 degrees.

According to one or more embodiments of the present disclosure, the first angle and the second angle may be different from one another.

According to one or more embodiments of the present disclosure, the substrate may include a plurality of first uncoated portions each of which corresponds to the first uncoated portion disposed on the first surface of the substrate.

According to one or more embodiments of the present disclosure, the first uncoated portion after notching may be in contact with the first side portion of the first coated portion.

According to one or more embodiments of the present disclosure, the electrode may further include a second coated portion disposed on a second surface of the substrate; and a second uncoated portion disposed on the second surface of the substrate, the second uncoated portion exposing the substrate, wherein a second side portion of the second coated portion in contact with the second uncoated portion may have a stepped surface.

According to one or more embodiments of the present disclosure, the second uncoated portion may be formed at a position corresponding to the first uncoated portion.

According to one or more embodiments of the present disclosure, the substrate may include a plurality of first uncoated portions, each of which corresponds to the first uncoated portion disposed on the first surface of the substrate, and a plurality of second uncoated portions, each of which may correspond to the second uncoated portion disposed on the second surface of the substrate.

According to one or more embodiments of the present disclosure, an electrode assembly may include a first electrode, a second electrode and a separator disposed between the first electrode and the second electrode, wherein the first electrode may include a substrate having a first uncoated portion and a second uncoated portion respectively disposed on a first surface and a second surface thereof, a first coated portion disposed on the first surface of the substrate, the first coated portion comprising a first active material, and a second coated portion disposed on the second surface of the substrate, the second coated portion comprising a second active material, wherein a first side portion of the first coated portion in contact with the first uncoated portion has a stepped surface.

According to one or more embodiments of the present disclosure, a second side portion of the second coated portion in contact with the second uncoated portion may have a stepped surface.

According to one or more embodiments of the present disclosure, a method for manufacturing an electrode for a secondary battery may include forming a first coated portion comprising an active material on a first surface of a substrate; and etching a first region of the first coated portion to form a first uncoated portion that exposes the first surface of the substrate, wherein a side portion of the first coated portion in contact with the first uncoated portion may have a stepped surface.

According to one or more embodiments of the present disclosure, the etching of the first region of the first coated portion may include laser-etching the first region of the first coated portion.

According to one or more embodiments of the present disclosure, the laser-etching of the first region of the first coated portion may include laser-etching the first region with a first irradiation area using a first laser-etching process; and laser-etching the first region with a second irradiation area different from the first irradiation area using a second laser-etching process.

According to one or more embodiments of the present disclosure, the first irradiation area may be smaller than the second irradiation area.

According to one or more embodiments of the present disclosure, the first irradiation area may have a first depth, the second irradiation area may have a second depth, and the first depth may be greater than the second depth.

According to one or more embodiments of the present disclosure, laser output power intensity of the laser-etching of the first laser-etching process may be different from laser output power intensity of the laser-etching of the second laser-etching process.

According to one or more embodiments of the present disclosure, the etching of the first region of the first coated portion may include simultaneously etching a plurality of first regions of the first coated portion, each of the plurality of first regions corresponds to the first region of the first coated portion.

According to one or more embodiments of the present disclosure, the method for manufacturing an electrode for a secondary battery may further include forming a tap by notching the substrate at the first region.

According to one or more embodiments of the present disclosure, the method for manufacturing an electrode for a secondary battery may further include forming a second coated portion comprising an active material on a second surface of a substrate; and etching a second region of the second coated portion to form a second uncoated portion that exposes the second surface of the substrate, wherein a side portion of the second coated portion in contact with the second uncoated portion may have a stepped surface, and the second uncoated portion may be formed at a position corresponding to the first uncoated portion, and the etching of the second region comprises etching a plurality of second regions each of which may correspond to the second region of the second coated portion are etched.

According to some embodiments of the present disclosure, by forming the stepped portion at the boundary region between the uncoated portion and the coated portion where the heat-affected zone is formed, the contact area between the heat-affected zone of the coated portion and the separator can be increased in a process of the battery assembly.

According to some embodiments of the present disclosure, the risk of damage to the separator can be reduced while maintaining the flatness of the active material at the boundary region between the coated portion and the uncoated portion.

However, aspects and features of the present disclosure are not limited to those described above, and other aspects and features not mentioned will be clearly understood by a person skilled in the art from the detailed description, described below.

BRIEF DESCRIPTION OF DRAWINGS

The following drawings attached to this specification illustrate embodiments of the present disclosure, and further describe aspects and features of the present disclosure together with the detailed description of the present disclosure. Thus, the present disclosure should not be construed as being limited to the drawings.

DETAILED DESCRIPTION

Figure 1:
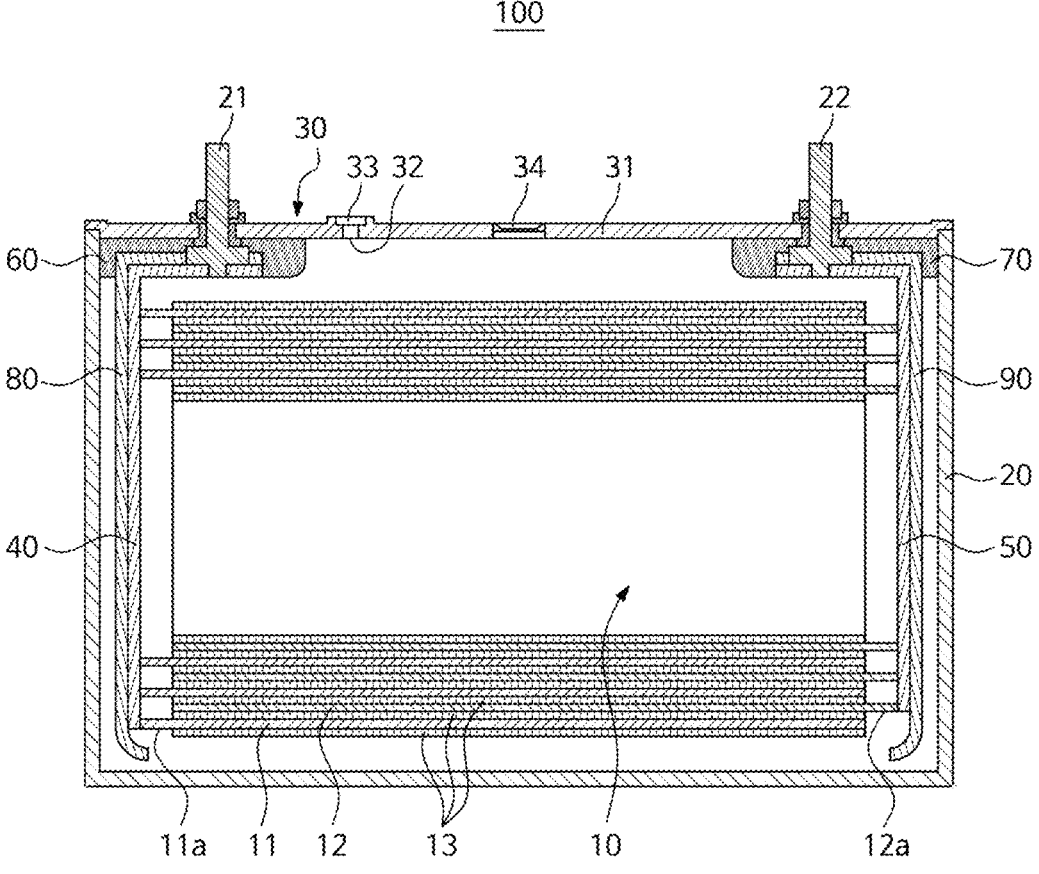
FIG. 1 is a perspective view illustrating an example of a secondary battery according to one or more embodiments of the present disclosure.

Hereinafter, embodiments of the present disclosure will be described, in detail, with reference to the accompanying drawings. The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term to explain his/her invention in the best way.

The embodiments described in this specification and the configurations shown in the drawings are only some of the embodiments of the present disclosure and do not represent all of the technical ideas, aspects, and features of the present disclosure. Accordingly, it should be understood that there may be various equivalents and modifications that can replace or modify the embodiments described herein at the time of filing this application.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. When phrases such as "at least one of A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112 (*a*) and 35 U.S.C. § 132 (a).

References to two compared elements, features, etc. as being "the same" may mean that they are "substantially the same". Thus, the phrase "substantially the same" may include a case having a deviation that is considered low in the art, for example, a deviation of 5% or less. In addition, when a certain parameter is referred to as being uniform in a given region, it may mean that it is uniform in terms of an average.

Throughout the specification, unless otherwise stated, each element may be singular or plural.

Arranging an arbitrary element "above (or below)" or "on (under)" another element may mean that the arbitrary element may be disposed in contact with the upper (or lower) surface of the element, and another element may also be interposed between the element and the arbitrary element disposed on (or under) the element.

In addition, it will be understood that when a component is referred to as being "linked," "coupled," or "connected" to another component, the elements may be directly "coupled," "linked" or "connected" to each other, or another component may be "interposed" between the components".

Throughout the specification, when "A and/or B" is stated, it means A, B or A and B, unless otherwise stated. That is, "and/or" includes any or all combinations of a plurality of items enumerated. When "C to D" is stated, it means C or more and D or less, unless otherwise specified.

FIG. 1 is a perspective view illustrating an example of a secondary battery 100 according to one or more embodiments of the present disclosure. The secondary battery 100 according to one or more embodiments of the present disclosure may include at least one electrode assembly 10 wound with a separator 13 as an insulator between the positive electrode 11 and the negative electrode 12, a case 20 in which the electrode assembly 10 is received (or accommodated) therein, and a cap assembly 30 coupled to an opening of the case 20.

The secondary battery 100 according to one or more embodiments illustrated in FIG. 1 will now be described as an example of a prismatic lithium ion secondary battery. However, the present disclosure is not limited thereto, and suitable aspects, features and principles described herein may be applied to various other types of batteries, such as lithium polymer batteries and/or cylindrical batteries.

Each of the positive electrode 11 and the negative electrode 12 may include a current collector made of a thin metal foil having a coated portion on which an active material is coated and an uncoated portion 11a, 12a on which an active material is not coated.

The positive electrode 11 and the negative electrode 12 are wound after interposing the separator 13, which is an insulator, therebetween. However, the present disclosure is not limited thereto, and the electrode assembly 10 may have a structure in which a positive electrode 11 and a negative electrode 12, each made of a plurality of sheets, are alternately stacked with a separator interposed therebetween.

The case 20 may form the overall outer appearance of the secondary battery 100 and may be made of a conductive metal, such as aluminum, aluminum alloy, nickel-plated steel, or stainless steel. In addition, the case 20 may provide a space in which the electrode assembly 10 is accommodated.

The cap assembly 30 may include a cap plate 31 covering an opening in the case 20, and the case 20 and the cap plate 31 may be made of a conductive material. The positive and negative electrode terminals 21 and 22 electrically connected to the positive electrode 11 and the negative electrode 12, respectively, may be installed to penetrate (or extend through) the cap plate 31 and protrude outwardly therethrough.

In addition, outer peripheral surfaces (e.g., circumferential surfaces) of upper pillars of the positive and negative electrode terminals 21 and 22 protruding outwardly from the cap plate 31 may be threaded and may be fixed to the cap plate 31 by utilizing nuts.

However, the present disclosure is not limited thereto, and the positive and negative electrode terminals 21 and 22 may have a rivet structure and may be riveted or welded to the cap plate 31.

In addition, the cap plate 31 may be made of a thin plate and may be coupled to the opening in the case 20, and an electrolyte injection port 32 into which a sealing stopper 33 may be installed may be located (e.g., formed) in the cap plate 31, and a vent portion 34 having a notch 34a may be installed.

The positive and negative electrode terminals 21 and 22 may be electrically connected to current collectors including first and second current collectors 40 and 50 (hereinafter referred to as positive and negative current collectors) by being bonded or coupled (e.g., by welding) to the positive uncoated portion 11a and the negative electrode uncoated portion 12a, respectively.

For example, the positive and negative electrode terminals 21 and 22 may be coupled by welding to the positive and negative electrode current collectors 40 and 50, respectively. However, the present disclosure is not limited thereto, and the positive and negative electrode terminals 21 and 22 and the positive and negative electrode current collectors 40 and 50 may be integrally formed in one or more embodiments.

In addition, an insulation member may be installed between the electrode assembly 10 and the cap plate 31. The insulation member may include first and second lower insulation members 60 and 70, and each of the first and second lower insulation members 60 and 70 may also have a portion located between the electrode assembly 10 and the case 20.

In addition, according to one or more embodiments of the present disclosure, one end of a separation member may face one side of the electrode assembly 10 and may be installed between the insulation member and the positive or negative electrode terminals 21 and 22.

In one or more embodiments, the separation member may include first and second separation members 80 and 90.

In such an embodiment, first ends of the first and second separation members 80 and 90 installed to face one side of the electrode assembly 10 may be respectively installed between the first and second lower insulation members 60 and 70 and the positive and negative electrode terminals 21 and 22.

Accordingly, the positive and negative electrode terminals 21 and 22, which may be coupled by welding to the positive and negative electrode current collectors 40 and 50, may be coupled to first ends of the first and second lower insulation members 60 and 70 and the first and second separation members 80 and 90.

Figure 2:
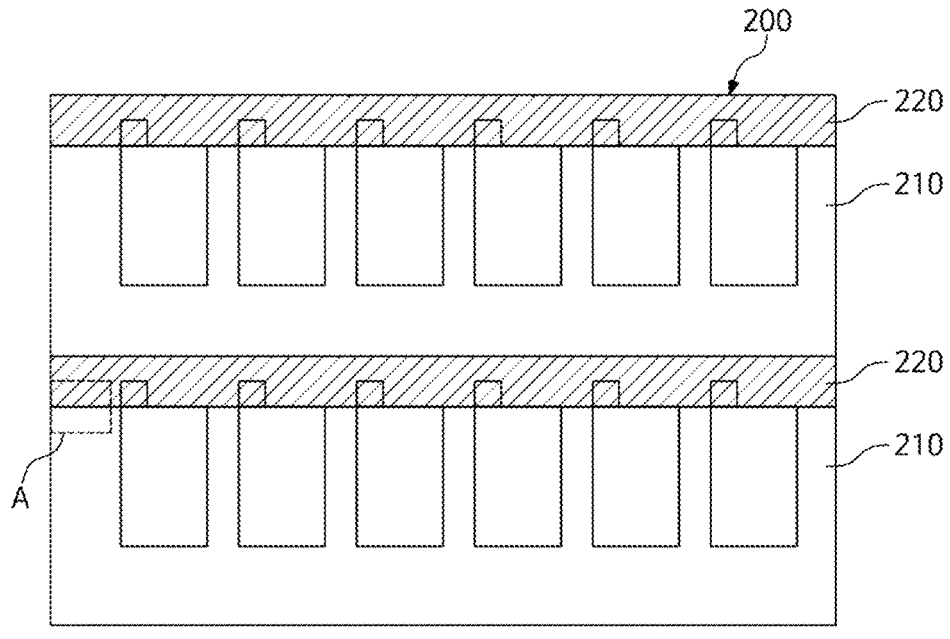
FIG. 2 is a first comparative example of a method for manufacturing an electrode for a secondary battery.
Figure 3:
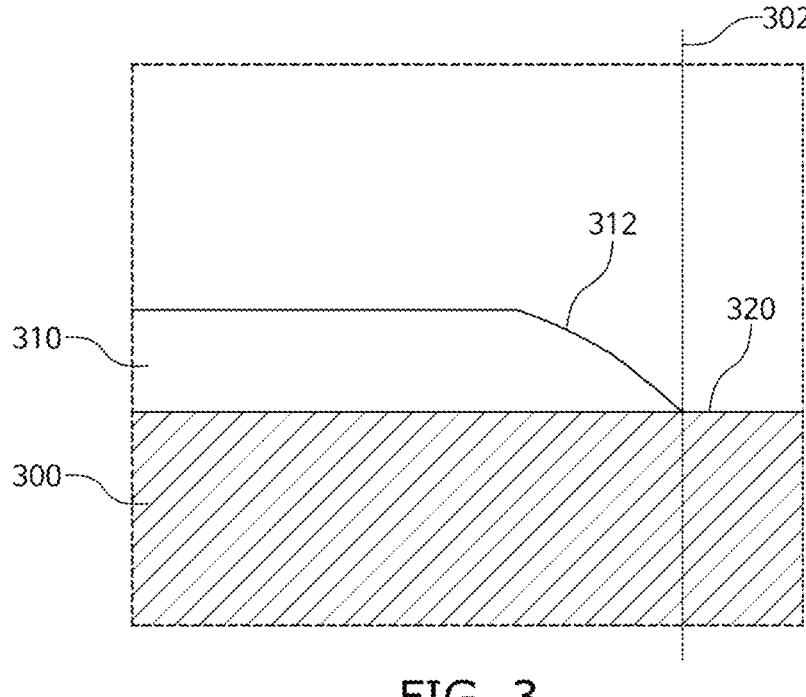
FIG. 3 is an enlarged cross-sectional view of a region where a coated portion and an uncoated portion are in contact according to the first comparative example.

FIG. 2 is a first comparative example of a method for manufacturing an electrode for a secondary battery, and FIG. 3 is an enlarged cross-sectional view of a region where a coated portion 310 and an uncoated portion 320 are in contact according to a first comparative example.

In one or more embodiments, an electrode for a secondary battery may be manufactured by applying an active material onto a metal thin film substrate. For example, in an electrode manufacturing process, an active material is applied to a roll-shaped metal thin film substrate, and the substrate coated with the active material is roll-pressed. Subsequently, a slitting process and a notching process are performed to cut the substrate into the desired shape of the electrode.

The electrode according to one or more embodiments of the present disclosure may correspond to a substrate coated with an active material prior to the notching process, or a substrate coated with an active material after the notching process. In the case of the substrate coated with the active material prior to the notching process, the electrode may include multiple components corresponding to tabs. In the case of the substrate coated with the active material after the notching process, the electrode may include a single component corresponding to a tab.

Referring to FIG. 2, the substrate 200 coated with the active material may have coated portions 210 and uncoated portions 220 that are alternately formed. Each coated portion 210 may refer to a region where the active material is applied onto the substrate 200, and each uncoated portion 220 may refer to a region where no active material is applied and the substrate 200 is exposed. The active material may be applied at regular intervals along a width direction of the substrate 200, resulting in the alternate formation of the coated portions 210 and the uncoated portions 220 along a longitudinal direction of the substrate 200. In this configuration, there is a problem in that wrinkles occur in the uncoated portions 220 due to the shrinkage of the active material and the substrate 200, thereby deteriorating the quality of the battery.

FIG. 3 is an enlarged cross-sectional view of a region A of FIG. 2. Referring to FIG. 3, a coated portion 310 where an active material is applied and an uncoated portion 320 where the active material is not applied may be formed on the substrate 300. The coated portion 310 may form a sloped surface 312 at a boundary region 302 where the coated portion 310 contacts the uncoated portion 320. For example, a thickness of the active material formed in the coated portion 310 may decrease as it approaches the boundary region 302 where the coated portion 310 contacts the uncoated portion 320. This phenomenon arises due to constraints in the shape of an ejection part of a slot die, which results in a reduction in the flatness of the active material in the vicinity of the boundary region 302 where the coated portion 310 contacts the uncoated portion 320. As a result, during the subsequent electrode stacking process, adhesion may be reduced, resulting in a shortened battery life and a reduced battery capacity.

Figure 4:
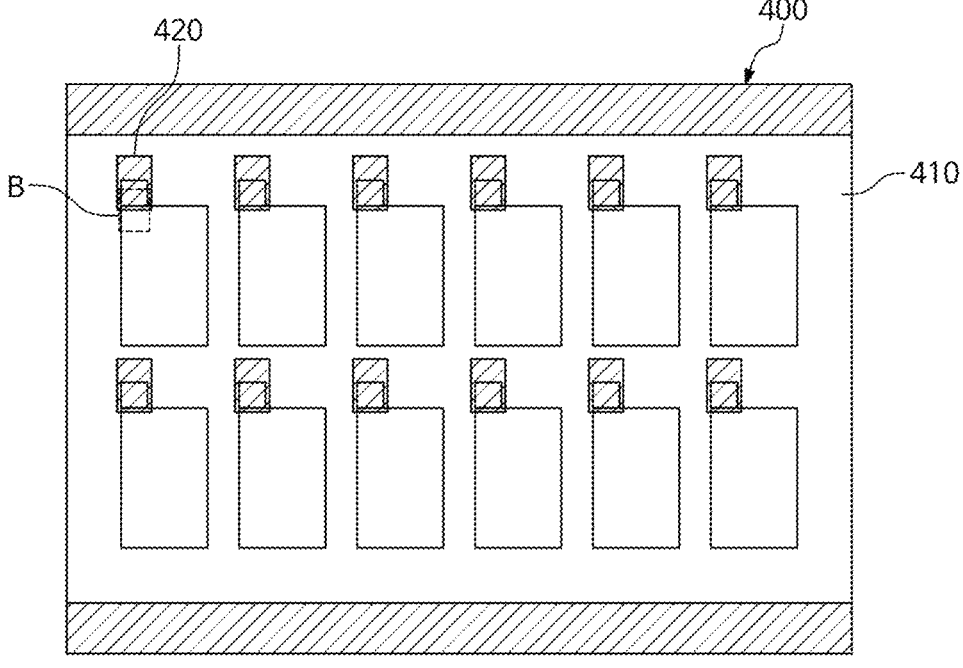
FIG. 4 is a second comparative example of a method for manufacturing an electrode for a secondary battery.
Figure 5:
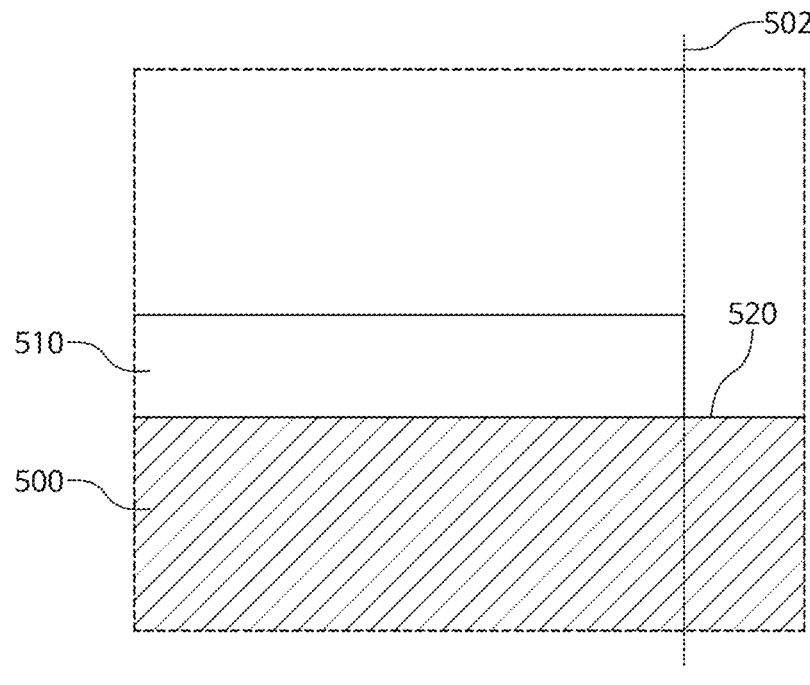
FIG. 5 is an enlarged cross-sectional view of a region where a coated portion and an uncoated portion are in contact according to the second comparative example.

FIG. 4 is a second comparative example of a method for manufacturing an electrode for a secondary battery, and FIG. 5 is an enlarged cross-sectional view of a region where a coated portion 510 and an uncoated portion 520 are in contact according to the second comparative example. According to one or more embodiments, an uncoated portion 420 of the electrode may be formed by etching a part of a coated portion 410. Specifically, in a substrate 400 where an active material entirely applied, a region corresponding to the uncoated portion 420 may be selectively laser-etched. In this case, the area of the uncoated portion 420 formed on the substrate 400 may be minimized. Thus, the occurrence of wrinkles in the uncoated portion 420 may be partially mitigated.

FIG. 5 is an enlarged cross-sectional view of a region B of FIG. 4. Referring to FIG. 5, a substrate 500 may include a coated portion 510 where an active material is applied and an uncoated portion 520 formed by laser-etching the active material applied onto the substrate 500. In the case of forming the uncoated portion 520 through the laser-etching process, a side portion of the coated portion 510 may be formed to be approximately perpendicular to the substrate 500 at a boundary region 502 where the coated portion 510 and the uncoated portion 520 are in contact. This configuration may partially address the issue of the decreased flatness of the active material at the boundary region 502 between the coated portion 510 and the uncoated portion 520.

However, in the case of forming the uncoated portion through the laser-etching process, a heat-affected zone due to laser output power may be formed near the boundary region 502 where the coated portion 510 and the uncoated portion 520 are in contact. The heat-affected active material may experience increased hardness, which may cause damage to a separator at a region where the separator contacts the heat-affected zone of the coated portion 510 in a process of the subsequent battery assembly. This problem may be exacerbated by a reduced contact area between the separator and the coated portion 510 due to the side portion of the coated portion 510 being formed approximately perpendicular to the substrate 500. Damage to the separator can increase the risk of battery short-circuiting. The present disclosure describes a method for manufacturing an electrode to address the above problems.

Figure 6:
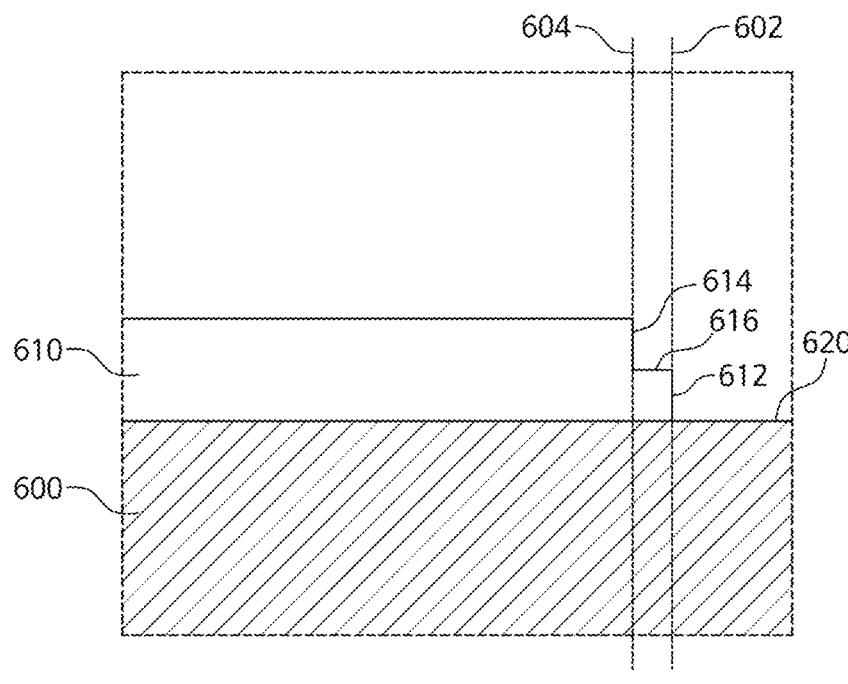
FIG. 6 is an enlarged cross-sectional view of a region where a coated portion and an uncoated portion are in contact according to one or more embodiments of the present disclosure.

FIG. 6 is an enlarged cross-sectional view of a region where a coated portion 610 and an uncoated portion 620 are in contact according to one or more embodiments of the present disclosure. In one or more embodiments, a stepped surface 616 may be formed at a side portion of the coated portion 610 in the region where the coated portion 610 and the uncoated portion 620 are in contact. Specifically, the side portion may include a first sidewall 612, a second sidewall 614, and the stepped surface 616 connecting the first sidewall 612 and the second sidewall 614. One end of the first sidewall 612 may be connected to an exposed substrate that corresponds to the uncoated portion 620, and the other end of the first sidewall 612 may be connected to the stepped surface 616. The first sidewall 612 may form a first angle with respect to one surface of the substrate 600. The first angle may be, but is not limited to being, within a range from 80 degrees to 90 degrees.

The stepped surface 616 may be connected to the first sidewall 612 and the second sidewall 614. The stepped surface 616 may be formed to be parallel to one surface of the substrate 600 or a top surface of the coated portion 610. Alternatively, the stepped surface 616 may be formed at an angle to one surface of the substrate or the top surface of the coated portion 610.

One end of the second sidewall 614 may be connected to the stepped surface 616, and the other end of the second sidewall 614 may be connected to the top surface of the coated portion 610. The second sidewall 614 may form a second angle with respect to one surface of the substrate 600. The second angle may be, but is not limited to being, within a range from 80 degrees to 90 degrees. The stepped surface 616 may be formed to be approximately parallel to one surface of the substrate 600, but is not limited thereto.

In one embodiment, the uncoated portion 620 may be formed by etching a part of the coated portion 610 formed on the substrate 600. Specifically, in a substrate 600 where an active material is entirely applied, a region corresponding to the uncoated portion 620 may be selectively laser-etched. In the case of forming the uncoated portion 620 through the laser-etching process, a side portion of the coated portion 610 may be formed to be approximately perpendicular to the substrate 600 at a first boundary region 602 where the coated portion 610 and the uncoated portion 620 are in contact. For example, the first sidewall 612 of the coated portion 610 may be formed to form an angle of 80 degrees to 90 degrees with respect to one surface of the substrate 600.

In one embodiment, the laser-etching process may be performed twice to form the stepped surface at the side portion of the coated portion 610. For example, in the first laser-etching process, the active material applied onto a region adjacent to the first boundary region 602 may be etched, and then in the second laser-etching process, the active material applied onto a region adjacent to a second boundary region 604 may be etched. Alternatively, the active material applied onto the region adjacent to the second boundary region 604 may be etched in the first laser-etching process, and then the active material applied onto the region adjacent to the first boundary region 602 may be etched in the second laser-etching process.

In one embodiment, laser irradiation areas and laser irradiation depths for the regions to be etched through the first laser-etching process and the second laser-etching process may be different from each other. Further, laser output power intensities for the first laser-etching process and the second laser-etching process may be different from each other. By controlling the laser output power intensity differently for each laser-etching process, the heat-affected zone can be controlled. An example of forming the stepped surface 616 at the side portion of the coated portion by the laser-etching process will be described in more detail in FIG. 7.

With this configuration, the stepped portion may be formed at the boundary region between the uncoated portion 620 and the coated portion 610 where the heat-affected zone is formed. Accordingly, the contact area between the heat-affected zone of the coated portion 610 and the separator may be increased in a process of the subsequent battery assembly. In this case, the risk of damage to the separator can be reduced while maintaining the flatness of the active material at the boundary region between the coated portion 610 and the uncoated portion 620.

Figure 7:
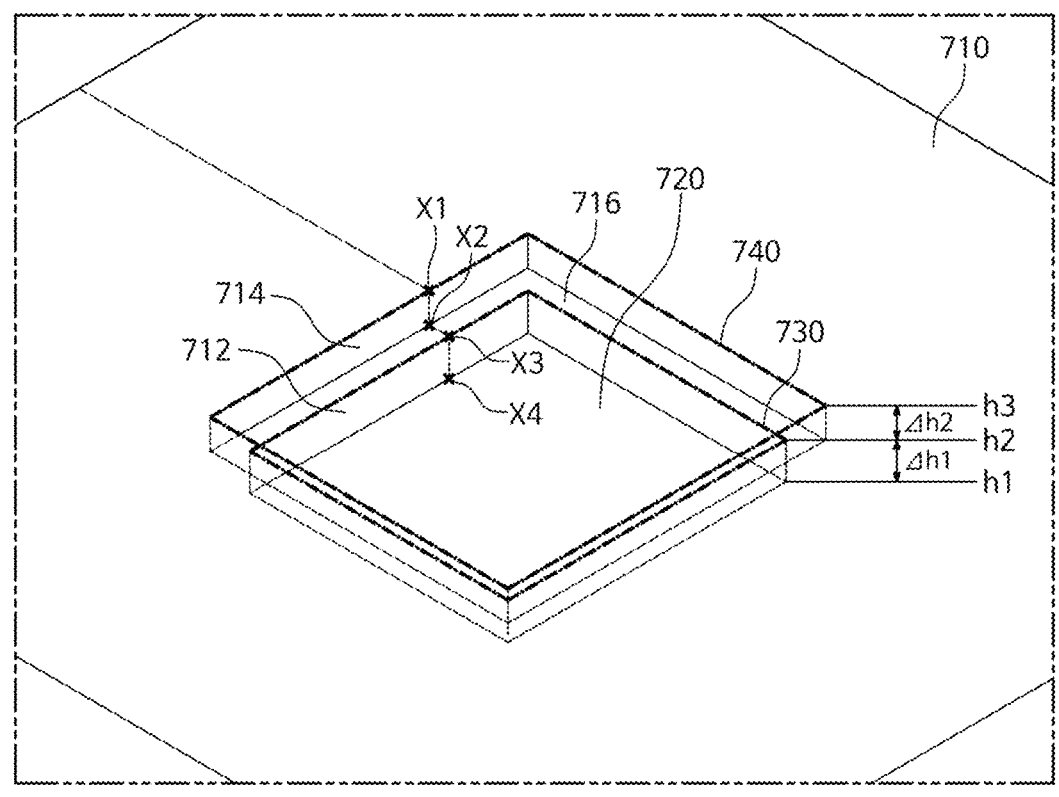
FIG. 7 is an enlarged perspective view illustrating an uncoated portion according to one or more embodiments of the present disclosure.

FIG. 7 is an enlarged perspective view illustrating an uncoated portion 720 according to one or more embodiments of the present disclosure. In one or more embodiments, the uncoated portion 720 may be formed by laser-etching a part of a coated portion 710. In this case, a stepped surface 716 may be formed at a side portion of the coated portion 710 that is formed in a region where the coated portion 710 and the uncoated portion 720 are in contact. For example, the side portion may include a first sidewall 712, a second sidewall 714, and a stepped surface 716 connecting the first sidewall 712 and the second sidewall 714.

In one embodiment, the stepped surface 716 formed at the side portion of the coated portion 710 may be formed through two laser-etching processes. For example, a first laser-etching process may form the first sidewall 712, and a second laser-etching process may form the second sidewall 714 and the stepped surface 716 connecting the first sidewall 712 and the second sidewall 714.

In one or more embodiments, through the first laser-etching process, a region corresponding to the uncoated portion 720 may be etched with a first irradiation area 730 and a first depth. The first depth may be a depth ($\Delta h1+\Delta h2$) from a surface (h3) of the coated portion 710 to a surface (h1) of the substrate.

Subsequently, through the second laser-etching process, the region corresponding to the uncoated portion 720 may be etched with a second irradiation area 740 and a second depth. The second depth may be a depth ($\Delta h2$) from the surface (h3) of the coated portion 710 to a predetermined surface (h2) of the stepped surface 716.

In one or more embodiments, the second irradiation area 740 may include the first irradiation area 730 while being larger than the first irradiation area 730. The difference between the second irradiation area 740 and the first irradiation area 730 may determine a width of the stepped surface 716 formed at the side portion of the coated portion 710.

In one or more embodiments, the laser output power intensities for laser-etching in the first laser-etching process and the second laser-etching process may differ from one another. For example, the laser output power intensity for the first laser-etching process for etching to the first depth may be greater than the laser output power intensity for the second laser-etching process for etching to the second depth that is shallower than the first depth.

In one embodiment, the first sidewall 712 may be formed at the side portion of the coated portion 710 through the first laser-etching process for etching to the first depth from the surface of the coated portion 710. The first sidewall 712 may be formed at an angle between 80 degrees and 90 degrees relative to one surface of the substrate, but is not limited thereto.

In one or more embodiments, through the second laser-etching process for etching to the second depth from the surface of the coated portion 710, the stepped surface 716 and the second sidewall 714 may be formed at the side portion of the coated portion 710. The second sidewall 714 may be formed at an angle between 80 degrees and 90 degrees relative to one surface of the substrate, but is not limited thereto. The stepped surface 716 connecting the first sidewall 712 and the second sidewall 714 may be formed to be approximately parallel to one surface of the substrate, but is not limited thereto.

In FIG. 7, it is described that the second laser-etching process is performed after the first laser-etching process; however, the sequence of the laser-etching processes is not limited thereto. For example, through the second laser-etching process, the region corresponding to the uncoated portion 720 may be etched with the second irradiation area 740 and the second depth. The second depth may be a depth ($\Delta h2$) from the surface (h3) of the coated portion 710 to the predetermined surface (h2) of the stepped surface. Thereafter, through the first laser-etching process, the region corresponding to the uncoated portion 720 may be etched with the first irradiation area 730 and the first depth. The first depth may be a depth ($\Delta h1$) from the predetermined surface (h2) of the stepped surface to the surface (h1) of the substrate.

In one embodiment, the laser-etching processes may be controlled such that only one laser-etching is performed on overlapping etching regions that occur during the multiple laser-etching processes. For example, if some of the irradiation areas for the respective laser-etching processes overlap each other, the laser-etching may be performed only on the non-overlapping irradiation areas. Instead of performing laser irradiation on all of the areas determined as the irradiation areas, the laser-etching may be performed on only those areas where the irradiation areas for the respective laser-etching processes do not overlap.

Alternatively, multiple laser-etchings may be performed on the overlapping etching areas that occur during the multiple laser-etching processes.

Figure 8:
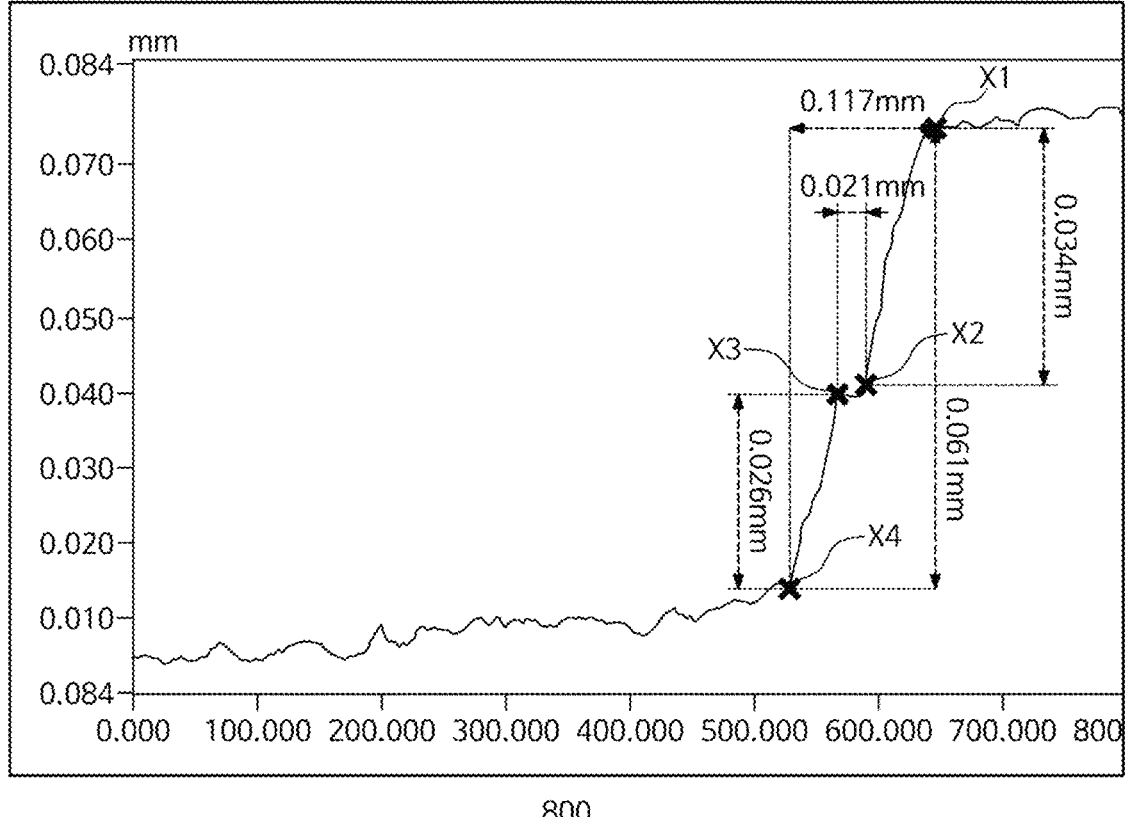
FIG. 8 is a graph illustrating a thickness of an active material layer based on a location of a region where the coated portion and the uncoated portion are in contact according to one or more embodiments of the present disclosure.

FIG. 8 is a graph 800 illustrating a thickness of an active material layer based on a location of a region where the coated portion and the uncoated portion are in contact according to one or more embodiments of the present disclosure. FIG. 8 is a graph depicting the thickness of the active material layer based on a longitudinal cross-section of the contact region between the coated portion 710 and the uncoated portion 720 shown in FIG. 7. Referring to FIG. 8, it is observed that the stepped surface is formed at the side portion of the coated portion. Specifically, the side portion of the coated portion may include the first sidewall (e.g., first sidewall 712 shown in FIG. 7), the second sidewall (e.g., second sidewall 714 shown in FIG. 7), and the stepped surface (e.g., stepped surface 716 shown in FIG. 7).

In one or more embodiments, a first point X1 may be a point where the second sidewall and the surface of the coated portion are in contact, and a second point X2 may be a point where the second sidewall and the stepped surface are in contact. Further, a third point X3 may be a point where the stepped surface and the first sidewall are in contact, and a fourth point X4 may be a point where the first sidewall and the surface of the substrate are in contact. The surface of the substrate with which the first sidewall contacts may be the uncoated portion.

In one or more embodiments, the first point X1 and the second point X2 may be located on the second sidewall, and the third point X3 and the fourth point X4 may be located on the first sidewall. Each of the first sidewall and the second sidewall formed on the side portion of the coated portion may be formed at an angle between 80 degrees and 90 degrees with respect to one surface of the substrate. The angle between the first sidewall and one surface of the substrate, and the angle between the second sidewall and one surface of the substrate may be different from one another, but are not limited thereto.

The dimensions for the widths and the heights of the first sidewall, the second sidewall, and the stepped surface shown in the graph 800 are merely exemplary and are not limited thereto. For example, the overall width of the side portion of the coated portion is shown to be about 0.117 mm, but without limitation, the overall width of the side portion may be determined to be about 0.1 mm or less.

Figure 9:
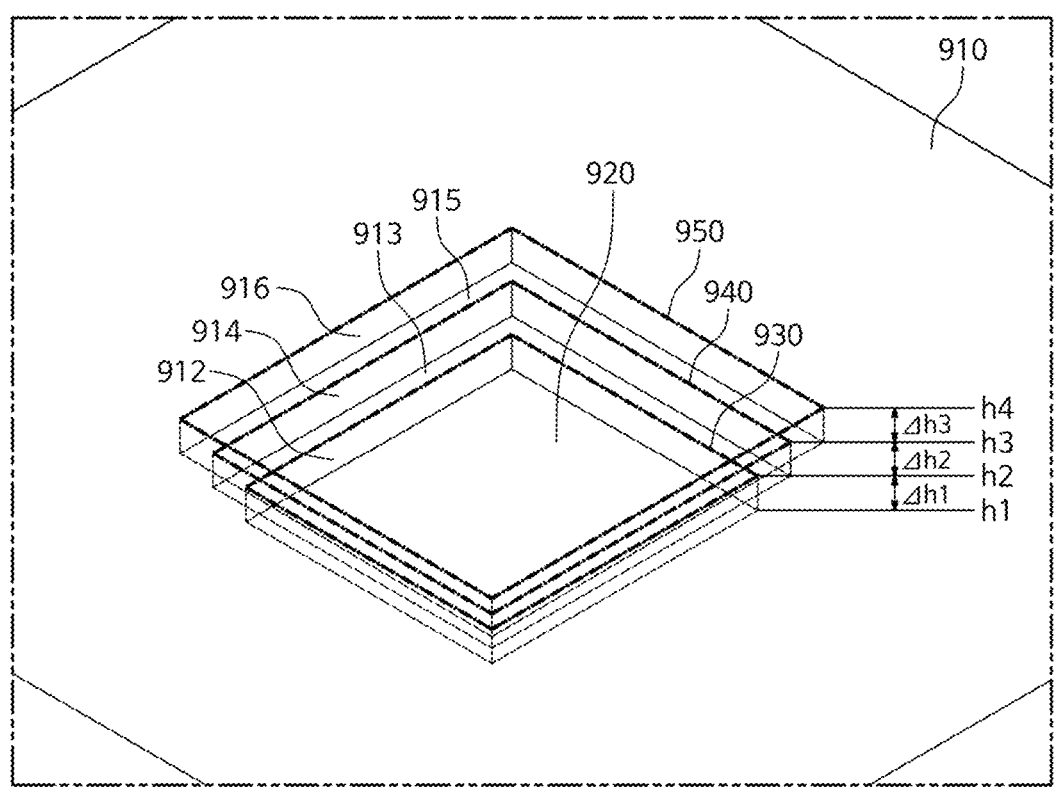
FIG. 9 is an enlarged perspective view illustrating an uncoated portion according to one or more embodiments of the present disclosure.

FIG. 9 is an enlarged perspective view illustrating an uncoated portion 920 according to one or more embodiments of the present disclosure. In one or more embodiments, the uncoated portion 920 may be formed by laser-etching a part of a coated portion 910. In this case, a plurality of stepped surfaces may be formed at a side portion of the coated portion 910 in a region where the coated portion 910 and the uncoated portion 920 are in contact. For the sake of convenience of explanation, FIG. 9 illustrates an example in which two stepped surfaces are formed at the side portion of the coated portion 910. For example, the side portion of the coated portion 910 may include a first sidewall 912, a second sidewall 914, a third sidewall 916, a first stepped surface 913 connecting the first sidewall 912 and the second sidewall 914, and a second stepped surface 915 connecting the second sidewall 914 and the third sidewall 916.

In one or more embodiments, the stepped surfaces formed at the side portion of the coated portion 910 may be formed through three laser-etching processes. For example, a first laser-etching process may form the first sidewall 912, a second laser-etching process may form the first stepped surface 913 and the second sidewall 914, and a third laser-etching process may form the second stepped surface 915 and the third sidewall 916.

In one or more embodiments, through the first laser-etching process, a region corresponding to the uncoated portion 920 may be etched with a first irradiation area 930 and a first depth. The first depth may be a depth ($\Delta h1 + \Delta h2 + \Delta h3$) from a surface (h4) of the coated portion 910 to a surface (h1) of the substrate. Thereafter, through the second laser-etching process, the region corresponding to the uncoated portion 920 may be etched with a second irradiation area 940 and a second depth. Further, the second depth may be a depth ($\Delta h2 + \Delta h3$) from a surface (h4) of the coated portion 910 to a predetermined surface (h2) of the first stepped surface 913. Next, through the third laser-etching process, the region corresponding to the uncoated portion 920 may be etched with a third irradiation area 950 and a third depth. The third depth may be a depth ($\Delta h3$) from the surface (h4) of the coated portion 910 to a predetermined surface (h3) of the second stepped surface 915.

In one or more embodiments, the second irradiation area 940 may include the first irradiation area 930 while being larger than the first irradiation area 930. The difference between the second irradiation area 940 and the first irradiation area 930 may determine a width of the first stepped surface 913. The third irradiation area 950 may include the second irradiation area 940 while being larger than the second irradiation area 940. The difference between the third irradiation area 950 and the second irradiation area 940 may determine a width of the second stepped plane 915.

In one or more embodiments, the laser output power intensities for laser-etching in the first laser-etching process, the second laser-etching process, and the third laser-etching process may differ from each other. For example, the laser output power intensity for the first laser-etching process for etching to the first depth may be greater than the laser output power intensity for the second laser-etching process for etching to the second depth that is shallower than the first depth. Further, the laser output power intensity for the second laser-etching process for etching to the second depth may be greater than the laser output power intensity for the third laser-etching process for etching to the third depth that is shallower than the second depth.

In one or more embodiments, the first sidewall 912 may be formed at the side portion of the coated portion 910 through the first laser-etching process for etching to the first depth from the surface of the coated portion 910. The first sidewall 912 may be formed at an angle between 80 degrees and 90 degrees relative to one surface of the substrate, but is not limited thereto.

In one or more embodiments, the first stepped surface 913 and the second sidewall 914 may be formed at the side portion of the coated portion 910 through the second laser-etching process for etching to the second depth from the surface of the coated portion 910. The second sidewall 914 may be formed at an angle between 80 degrees and 90 degrees relative to one surface of the substrate, but is not limited thereto. The first stepped surface 913 connecting the first sidewall 912 and the second sidewall 914 may be formed to be approximately parallel to one surface of the substrate, but is not limited thereto.

In one or more embodiments, the second stepped surface 915 and the third sidewall 916 may be formed at the side portion of the coated portion 910 through the third laser-etching process for etching to the third depth from the surface of the coated portion 910. The third sidewall 916 may be formed at an angle between 80 degrees and 90 degrees relative to one surface of the substrate, but is not limited thereto. The second stepped surface 915 connecting the second sidewall 914 and the third sidewall 916 may be formed to be approximately parallel to one surface of the substrate, but is not limited thereto.

In FIG. 9, it is described that the second laser-etching process is performed after the first laser-etching process, and the third laser-etching process is performed after the second laser-etching process. However, the sequence of the laser-etching processes is not limited thereto. For example, through the third laser-etching process, the region corresponding to the uncoated portion 920 may be etched with the third irradiation area 950 and the third depth. The third depth may be a depth ($\Delta h3$) from the surface (h4) of the coated portion 910 to the predetermined surface (h3) of the second stepped surface. Thereafter, through the second laser-etching process, the region corresponding to the uncoated portion 920 may be etched with the second irradiation area 940 and the second depth. The second depth may be a depth ($\Delta h2$) from the predetermined surface (h3) of the second stepped surface to the predetermined surface (h2) of the first stepped surface. Next, through the first laser-etching process, the region corresponding to the uncoated portion 920 may be etched with the first irradiation area 930 and the first depth. The first depth may be a depth ($\Delta h1$) from the predetermined surface (h2) of the first stepped surface to the surface (h1) of the substrate.

In FIG. 9, it is described that the two stepped surfaces are formed at the side portion of the coated portion 910. However, the number of stepped surfaces is not limited thereto, and the number of steppe surfaces may be appropriately varied depending on the thickness of the coated portion, the angle of the side portion of the coated portion, and the like.

Figure 10:
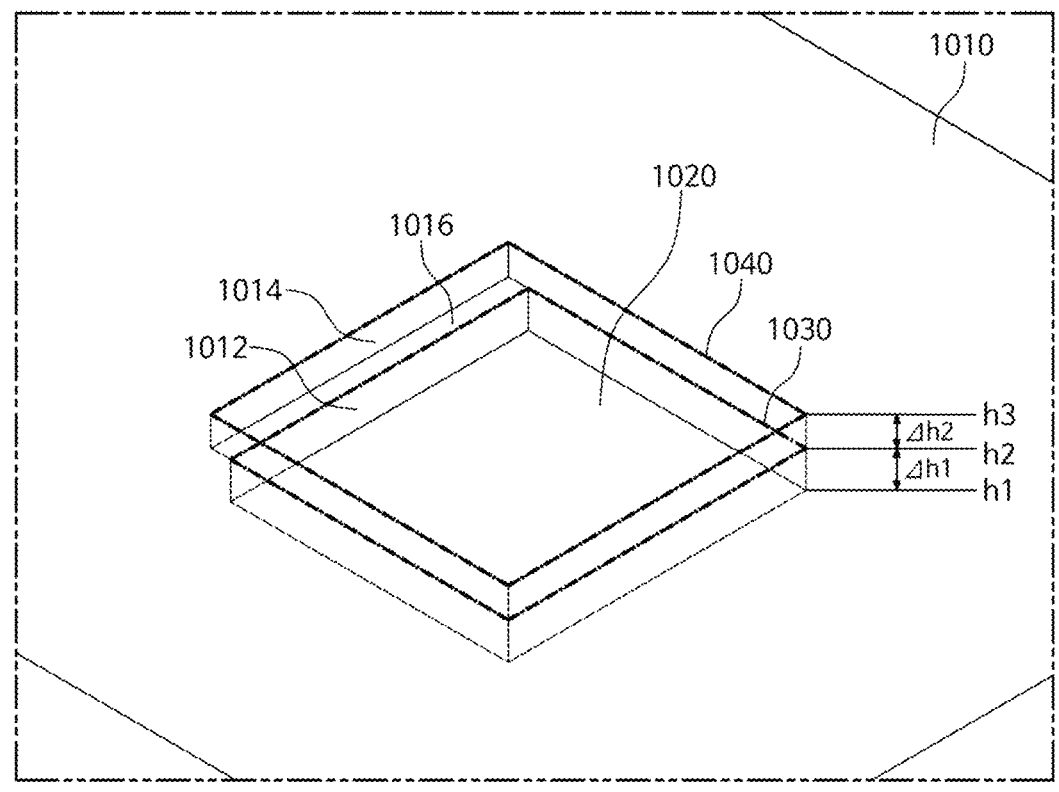
FIG. 10 is an enlarged perspective view illustrating an uncoated portion according to one or more embodiments of the present disclosure.

FIG. 10 is an enlarged perspective view illustrating an uncoated portion according to one or more embodiments of the present disclosure. In FIG. 10, description of redundant components that are identical to those in FIG. 7 will be omitted.

In one or more embodiments, a stepped surface 1016 formed at a side portion of the coated portion 1010 may be formed through two laser-etching processes. For example, a first laser-etching process may form a first sidewall 1012, and a second laser-etching process may form a second sidewall 1014 and the stepped surface 1016.

In one or more embodiments, the stepped surface 1016 may be formed on at least one side of the side portion of the coated portion 1010. For example, as shown in FIG. 10, in a case where a region forming an uncoated portion 1020 is substantially rectangular in shape, the stepped surface 1016 may be formed at the side portion of the uncoated portion 1010 corresponding to at least one side of the rectangle. In this case, the side portion of the coated portion 1010 at which the stepped surface 1016 is formed may correspond to a region where the coated portion and the uncoated portion of the electrode are in contact after the notching process.

In one or more embodiments, through the first laser-etching process, a region corresponding to the uncoated portion 1020 may be etched with a first irradiation area 1030 and a first depth. The first depth may be a depth ($\Delta h1 + \Delta h2$) from a surface (h3) of the coated portion 1010 to a surface (h1) of the substrate.

Thereafter, through the second laser-etching process, the region corresponding to the uncoated portion 1020 may be etched with a second irradiation area 1040 and a second depth. The second depth may be a depth ($\Delta h2$) from the surface (h3) of the coated portion 1010 to a predetermined surface (h2) of the stepped surface 1016.

In one or more embodiments, the second irradiation area 1040 may include the first irradiation area 1030 while being larger than the first irradiation area 1030. For example, as shown in FIG. 10, in a case where the first irradiation area 1030 and the second irradiation area 1040 are substantially rectangular in shape, the first irradiation area 1030 and the second irradiation area 1040 are formed in such a manner that a length of the first irradiation area 1030 may be the same as a length of the second irradiation area 1040 in one direction while a length of the first irradiation area 1030 is shorter than a length of the second irradiation area 1040 in the other direction. In this case, the difference between the length of the first irradiation area 1030 and the length of the second irradiation area 1040 in the other direction may determine a width of the stepped surface 1016.

Figure 11:
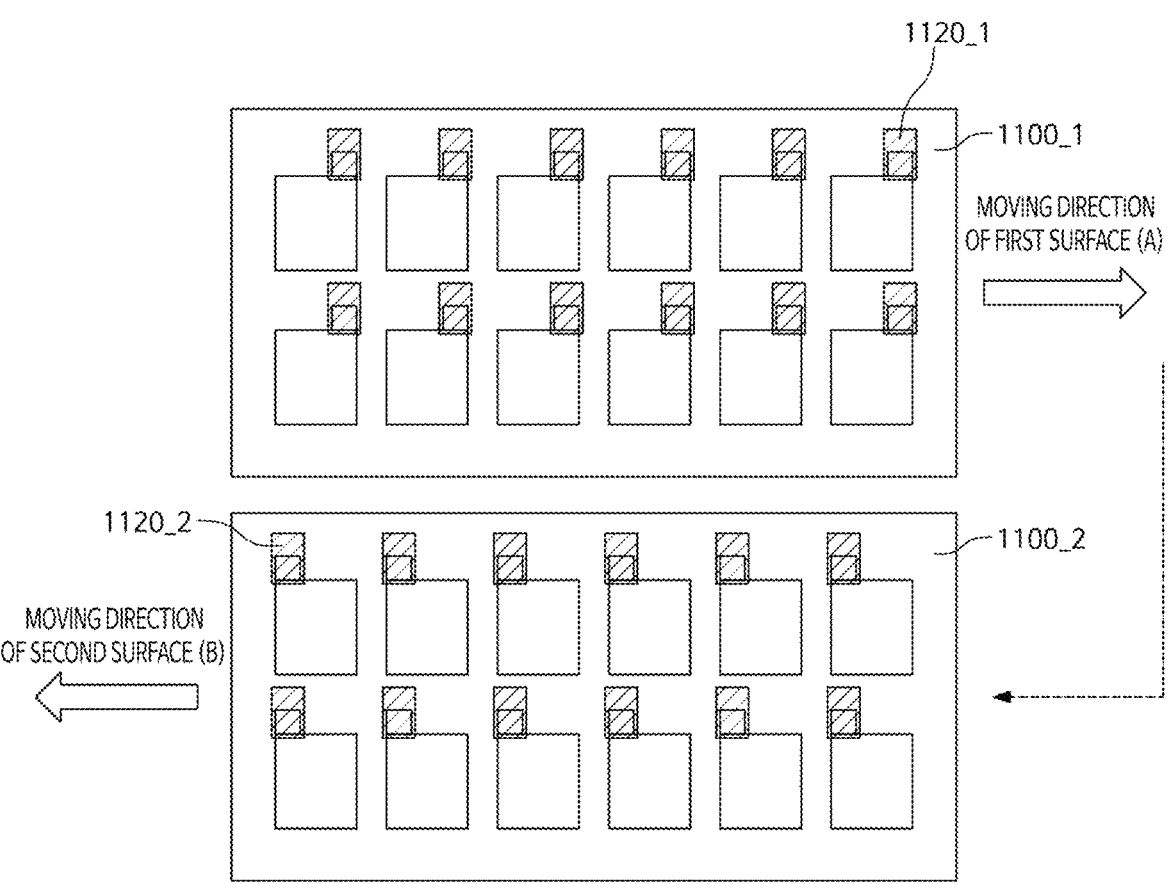
FIG. 11 is a diagram illustrating an example of forming uncoated portions on both sides of a substrate according to one or more embodiments of the present disclosure.

FIG. 11 is a diagram illustrating an example of forming uncoated portions 1120_1 and 1120_2 on both sides of a substrate according to one or more embodiments of the present disclosure. In one or more embodiments, an electrode for a secondary battery is manufactured by applying an active material onto a substrate in the form of a metal thin film. In this case, the active material may be entirely applied onto both sides of the substrate. For example, a first coated portion 1100_1 coated with a first active material may be formed on a first surface of the substrate, and a second coated portion 1100_2 coated with a second active material may be formed on a second surface of the substrate, which is the opposite side of the first surface. The substrate coated with the active material may be roll-pressed by a roll pressing process, and an uncoated portion may be formed on the rolled substrate.

In one or more embodiments, the uncoated portion of the electrode may be formed by etching a part of the coated portion. Specifically, in a substrate where an active material is entirely applied, a region corresponding to the uncoated portion may be selectively laser-etched. For example, the uncoated portion may be formed by etching the first coated portion 1100_1 formed on the first surface of the substrate.

By using a laser etching device, a plurality of uncoated portions may be continuously formed on the substrate as the first surface of the substrate moves along a first direction. Then, a second surface of the substrate moves along a second direction, and a plurality of uncoated portions may be formed continuously on the substrate. The second surface corresponds to a side opposite to the first surface of the substrate.

In one or more embodiments, the plurality of uncoated portions formed on the second surface may be formed at locations corresponding to the plurality of uncoated portions formed on the first surface. For example, the second uncoated portion 1120_2 formed on the second surface of the substrate may be formed at a position corresponding to the first uncoated portion 1120_1 formed on the first surface of the substrate. In this case, the positional error between the first uncoated portion 1120_1 and the second uncoated portion 1120_2 may be adjusted to be within 2 mm in the longitudinal direction of the substrate.

In FIG. 11, for the sake of clarity of explanation, the moving direction of the first surface of the substrate and the moving direction of the second surface of the substrate are shown to be in opposite directions, but the present disclosure is not limited thereto.

Figure 12:
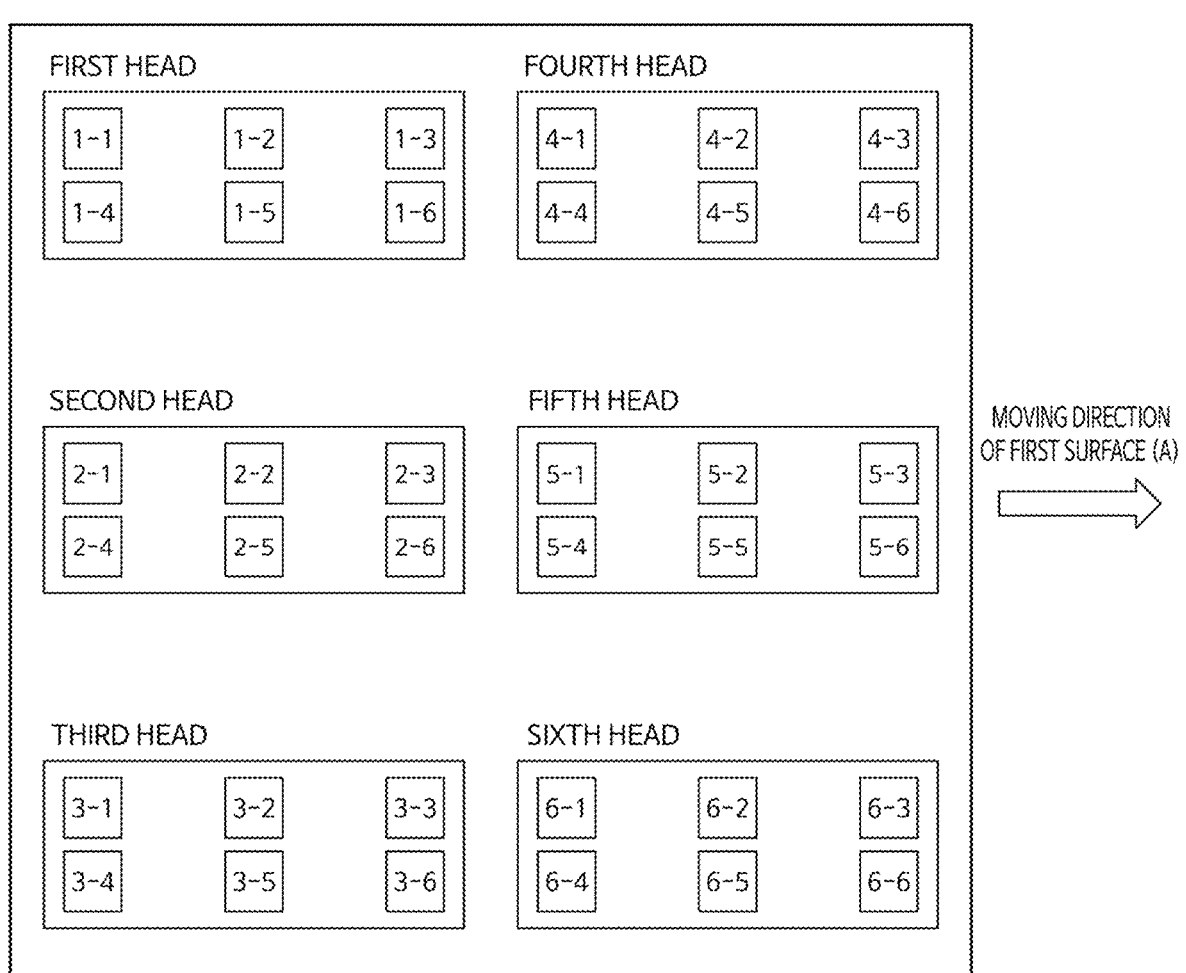
FIG. 12 is a diagram illustrating an example of forming a plurality of uncoated portions on one surface of a substrate according to one or more embodiments of the present disclosure.

FIG. 12 is a diagram illustrating an example of forming a plurality of uncoated portions on one surface of a substrate according to one or more embodiments of the present disclosure. In one embodiment, the plurality of uncoated portions may be etched simultaneously by a laser etching device. For example, the laser etching device may include a plurality of laser heads. The laser etching device may simultaneously etch a plurality of regions corresponding to the uncoated portions on the substrate using the plurality of laser heads while moving the substrate coated with the active material in a certain direction.

In FIG. 12, it is illustrated that the laser etching device includes six laser heads, but the present disclosure is not limited thereto. In addition, in FIG. 12, it is illustrated that each of the uncoated portions formed by the laser etching device has a substantially square shape, but the present disclosure is not limited thereto. The shape and size of each of the uncoated portions may be appropriately changed depending on the design of the electrode to be manufactured.

Figure 13:
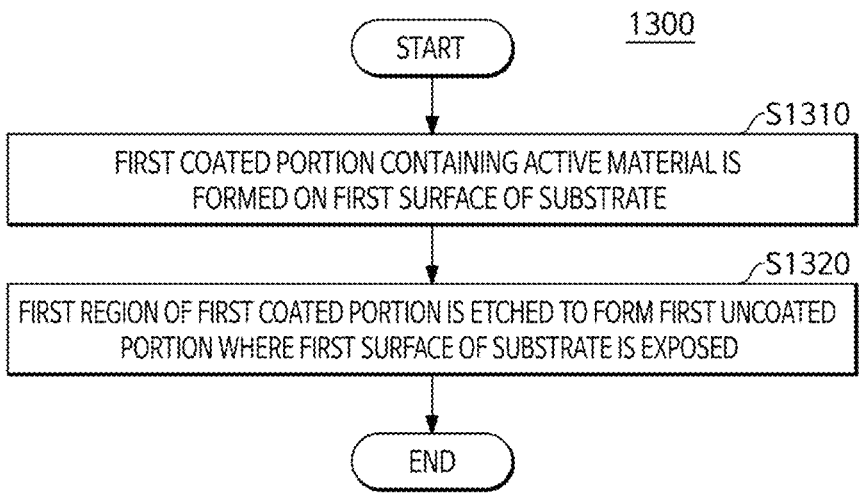
FIG. 13 is a flowchart of a method 1300 for manufacturing an electrode for a secondary battery according to one or more embodiments of the present disclosure.

FIG. 13 is a flowchart of a method 1300 for manufacturing an electrode for a secondary battery according to one or more embodiments of the present disclosure. In one or more embodiments, the method 1300 for manufacturing the electrode for the secondary battery may be initiated by forming a first coated portion containing an active material on a first surface of a substrate (step S1310).

Then, a first region of the first coated portion may be etched to form a first uncoated portion where the first surface of the substrate is exposed (step S1320). For example, the first region of the first coated portion may be etched using laser-etching. In one or more embodiments, a plurality of first regions of the first coated portion may be etched simultaneously. Then, the substrate may be notched at the etched first region of the first coated portion to form a tab.

In one or more embodiments, a side portion of the first coated portion in contact with the first uncoated portion may have a stepped surface. For example, through a first laser-etching process, the first region may be laser-etched with a first irradiation area, and through a second laser-etching process, the first region may be laser-etched with a second irradiation area that is different from the first irradiation area. In this case, the first irradiation area may be smaller than the second irradiation area.

Furthermore, the first irradiation area may have a first depth, and the second irradiation area may have a second depth. In this case, the first depth may be greater than the second depth. Additionally, laser output power intensities for laser etching of the first laser-etching process and the second laser-etching process may be different from each other.

In one or more embodiments, the method may further include forming a second coated portion containing the active material on a second surface of the substrate. Further, in order to form a second uncoated portion where the second surface of the substrate is exposed, a second region of the second coated portion may be etched. In this case, a side portion of the second coated portion in contact with the second uncoated portion may also have a stepped surface. In one embodiment, a plurality of second regions of the second coated portion may be etched. Additionally, the second uncoated portion may be formed at a position corresponding to the first uncoated portion.

Although the present disclosure has been described above with respect to embodiments thereof, the present disclosure is not limited thereto. Various modifications and variations can be made thereto by those skilled in the art within the spirit of the present disclosure and the equivalent scope of the appended claims.

[DESCRIPTION OF SOME REFERENCE SYMBOLS]

| | |
|---|---|
| 10: electrode assembly | 11: positive electrode |
| 11a: uncoated portion | 12: negative electrode |
| 12a: uncoated portion | 13: separator |
| 20: case | 21: positive electrode terminal |
| 22: negative electrode terminal | 30: cap assembly |
| 31: cap plate | 32: electrolyte injection port |
| 33: sealing stopper | 34: vent portion |
| 40: first current collector | 50: second current collector |
| 60: first lower insulation member | 70: second lower insulation member |
| 80: first separation member | 90: second separation member |
| 100: secondary battery | |

What is claimed is:

1. An electrode comprising:

a substrate;

a first coated portion disposed on a first surface of the substrate, the first coated portion comprising an active material; and a first uncoated portion disposed on the first surface of the substrate, the first uncoated portion being in contact with the first coated portion and exposing the substrate, wherein a first side portion of the first coated portion in contact with the first uncoated portion has a stepped surface;

the first side portion comprises first and second side walls joined together by the stepped surface; and the first and second side walls are substantially perpendicular to the first surface of the substrate, wherein the first coated portion comprises a first zone that is a central region spaced apart from the first side portion, and a second zone that includes the first side portion and is positioned between the first zone and the first uncoated portion, and wherein a hardness of at least a portion of the second zone is greater than a hardness of the first zone.

2. The electrode as claimed in claim 1, wherein the substrate comprises a plurality of first uncoated portions each of which corresponds to the first uncoated portion disposed on the first surface of the substrate.

3. The electrode as claimed in claim 1, further comprising:

a second coated portion disposed on a second surface of the substrate; and a second uncoated portion disposed on the second surface of the substrate, the second uncoated portion exposing the substrate, wherein a second side portion of the second coated portion in contact with the second uncoated portion has a stepped surface.

4. The electrode as claimed in claim 3, wherein the second uncoated portion is formed at a position corresponding to the first uncoated portion.

5. The electrode as claimed in claim 4, wherein the substrate includes a plurality of first uncoated portions, each of which corresponds to the first uncoated portion disposed on the first surface of the substrate, and a plurality of second uncoated portions, each of which corresponds to the second uncoated portion disposed on the second surface of the substrate.

6. An electrode assembly comprising:

a first electrode;

a second electrode; and a separator disposed between the first electrode and the second electrode, wherein the first electrode comprises:

a substrate having a first uncoated portion and a second uncoated portion respectively disposed on a first surface and a second surface thereof, a first coated portion disposed on the first surface of the substrate, the first coated portion comprising a first active material, and a second coated portion disposed on the second surface of the substrate, the second coated portion comprising a second active material, wherein a first side portion of the first coated portion in contact with the first uncoated portion has a stepped surface;

the first side portion comprises first and second side walls joined together by the stepped surface; and the first and second side walls are substantially perpendicular to the first surface of the substrate, wherein the first coated portion comprises a first zone that is a central region spaced apart from the first side portion, and a second zone that includes the first side portion and is positioned between the first zone and the first uncoated portion, and wherein a hardness of at least a portion of the second zone is greater than a hardness of the first zone.

7. The electrode assembly as claimed in claim 6, wherein a second side portion of the second coated portion in contact with the second uncoated portion has a stepped surface.

* * * * *